United States Patent
Biel et al.

(10) Patent No.: US 9,731,458 B2
(45) Date of Patent: Aug. 15, 2017

(54) LENS MOLD CARRIER

(71) Applicant: Novartis AG, Basel (CH)

(72) Inventors: Roger Biel, Aschaffenburg (DE);
Karsten Straube, Lutherstadt Wittenberg (DE); Jan Bernard, Niedernberg (DE)

(73) Assignee: Novartis AG, Basel (CH)

(*) Notice: Subject to any disclaimer, the term of this patent is extended or adjusted under 35 U.S.C. 154(b) by 418 days.

(21) Appl. No.: 14/551,425

(22) Filed: Nov. 24, 2014

(65) Prior Publication Data
US 2015/0147425 A1    May 28, 2015

Related U.S. Application Data

(60) Provisional application No. 61/909,435, filed on Nov. 27, 2013.

(51) Int. Cl.
*B29C 33/20* (2006.01)
*B29D 11/00* (2006.01)
*B29C 33/30* (2006.01)
*B29C 33/00* (2006.01)

(52) U.S. Cl.
CPC ...... *B29D 11/00182* (2013.01); *B29C 33/306* (2013.01); *B29D 11/005* (2013.01); *B29C 33/0022* (2013.01)

(58) Field of Classification Search
CPC ............ B29C 33/303; B29C 33/305; B29D 11/00182; B29D 11/005; B29D 11/0038
See application file for complete search history.

(56) References Cited

U.S. PATENT DOCUMENTS

| 6,311,967 | B1 | 11/2001 | Bickert |
| 6,511,311 | B1* | 1/2003 | Popps ............. B29D 11/00432 425/451.9 |
| 6,669,460 | B1 | 12/2003 | Tai |
| 9,539,743 | B2* | 1/2017 | Huber .................. B29C 33/303 |

OTHER PUBLICATIONS

PCT International Search Report dated Apr. 2, 2015, International Application No. PCT/EP2014/075350 filed Nov. 24, 2014.
PCT Written Opinion of the International Searching Authority dated Apr. 2, 2015, International Application No. PCT/EP2014/075350 filed Nov. 24, 2014.

* cited by examiner

*Primary Examiner* — Thukhanh T Nguyen
(74) *Attorney, Agent, or Firm* — Robert A. Ambrose (57) ABSTRACT

A lens mold carrier (1; 2) comprises:
a frame (10; 20) extending in a plane (x,y; u,v) and comprising a plurality of individual compartments (100; 200); at least one mold unit (11; 21) arranged in one of the individual compartments (100; 200) in a manner secured against falling out, the at least one mold unit (11; 21) including an adapter piece (110; 210) and a lens mold (112; 212) fixedly connected to the adapter piece (110; 210).
The adapter piece (110; 210) is floatingly arranged within the compartment (100; 200) to allow for limited movement of the adapter piece (110; 210) within the compartment (100; 200) at least in a translation plane parallel to or coincident with the plane (x,y; u,v) in which the frame (10; 20) extends.

20 Claims, 8 Drawing Sheets

LENS MOLD CARRIER

This application claims the benefit under 35 USC §119 (e) of U.S. provisional application Ser. No. 61/909,435 filed Nov. 27, 2013, incorporated herein by reference in its entirety.

FIELD

The invention relates to a lens mold carrier in accordance with the features specified in the independent claims. More specifically, the invention relates to a lens mold carrier that can be used in the manufacture of ophthalmic lenses, in particular contact lenses such as soft contact lenses.

BACKGROUND

Ophthalmic lenses such as contact lenses, and in particular soft contact lenses for single use, are produced in an automatic lens manufacturing process with the aid of automatic manufacturing lines. In such an automatic manufacturing line, the contact lenses are typically formed using molds comprising male and female molds. In the following, the terms "mold" or "molds" are used to include or denote a "mold half" or "mold halves", respectively, unless the specification explicitly suggests otherwise. A flowable lens forming material is dispensed into one of the molds, for example into the female mold, and the male and female molds are then mated to enclose the lens forming material between the molding surfaces of the male and female mold to define the shape of the contact lens. Thereafter, the lens forming material enclosed between the molding surfaces is cured to form the contact lens, the mold is opened and the contact lens is removed from the male or female mold for further processing.

The individual manufacturing steps of the automatic lens manufacturing process are carried out at various different process stations in such automatic manufacturing line, and the process steps are concurrently carried out in such process stations for a plurality of lenses. For example, lens forming material is dispensed into a plurality of molds at the same time, the plurality of molds is then transported together to a process station where the male and female molds are concurrently mated, the plurality of mated molds are then transported together to the curing station where the lens forming material is cured, and so on.

During mating the male and female molds, the male and female molds must be properly aligned relative to each other in order to make sure that the contact lens defined by the molding surfaces of the mated male and female molds has the desired geometry. To provide for proper alignment of the male and female molds, in a known process and manufacturing line the male and female molds are provided in rigid mold carriers each carrying two molds of the same type, for example two male molds or two female molds. The male molds and the female molds are fixedly mounted in sleeves which are rigidly mounted to the respective mold carrier. The sleeves axially extend beyond the molding surfaces of the respective molds. During the process of mating the male and female molds the sleeves of the male and female molds come into telescopic engagement with each other, and once they are in telescopic engagement the mold carriers are further moved towards each other to a final position in which an abutment portion of the sleeve of the male mold abuts against a corresponding abutment portion of the sleeve of the female mold. In this final position the male and female molds of that mold are in proper alignment and have the proper position relative to each other so that the contact lens formed by that mold has the desired geometry.

Obviously, this requires that the sleeves of the mold carrier carrying the two female molds and the sleeves of the mold carrier carrying the two male molds must be very precisely mounted to the respective mold carriers, since due to their rigid mounting to the respective mold carrier only a small deviation of a sleeve from its set position is possible, otherwise the associated sleeves of the mold carrier carrying the male molds and of the mold carrier carrying the female molds cannot get telescopically engaged. Since only very small deviations from the set position are tolerable, mold carriers carrying only two molds are used.

On the other hand, as has been outlined above a plurality of molds of the same type, for example ten to fourteen molds, are typically concurrently processed in one processing station in order to make the manufacturing process highly effective. Accordingly, five to seven such carriers each carrying two molds of the same type are transported in a "pack" to the mating station. This transport is achieved with the aid of conveyor belts on which the pack of mold carriers is placed. As the pack of mold carriers arrives at the processing station, the foremost carrier of the pack of mold carriers hits a positioning stopper making the entire pack of mold carriers abruptly stop. This abrupt stopping of the mold carriers of the pack leads to wear of the conveyor belts slipping underneath the carriers.

At the mating station it must be confirmed that each of the carriers of the pack has safely arrived. This is achieved with the aid of optical sensors (light barriers). However, such light barriers are prone to errors. By way of example, a small water droplet may partially or entirely cover the receiver of the light barrier so that the receiver may produce a signal representative of a carrier being present although actually there is no carrier present.

In the mating station, the sleeves of each carrier carrying the two female molds must be individually aligned with the sleeves of the associated carrier carrying the two male molds. This alignment is performed with the aid of so-called "positioning rakes" having positioning prongs which force the individual sleeves (and the carriers) into the desired set position. This positioning is performed both for the carriers carrying the female molds and for the carriers carrying the male molds. Thereafter, the sleeves of all carriers carrying male molds can reliably get into telescopic engagement with the sleeves of the corresponding carriers carrying female molds. However, due to some of the individual sleeves (and consequently the carriers) of the pack having to be significantly displaced (the displacement can amount up to some millimeters) from their original position after arrival in the mating station to the set position in which they can reliably get into telescopic engagement with their associated sleeves, this positioning step may lead to high mechanical wear of the positioning prongs.

SUMMARY

It is therefore an object of the invention to suggest a lens mold carrier which can be used in the automatic production of ophthalmic lenses, in particular in the automatic production of contact lenses such as soft contact lenses, and which overcomes the afore-mentioned disadvantages of prior art lens mold carriers.

The mold carrier according to the invention comprises:
a frame extending in a plane and comprising a plurality of individual compartments;

at least one mold unit arranged in one of the individual compartments in a manner secured against falling out, the at least one mold unit including an adapter piece and a lens mold fixedly connected to the adapter piece;

wherein the adapter piece is floatingly arranged within the compartment to allow for limited movement of the adapter piece within the compartment at least in a translation plane parallel to or coincident with the plane in which the frame extends.

In one embodiment of the lens mold carrier according to the invention, the range of limited movement of the adapter piece within the individual compartment of the frame in the translation plane is up to about 0.5 mm (in each of the positive or negative x- or y directions; i.e. ±0.5 mm), more preferably up to about 0.3 mm (in each of the positive or negative x- or y directions; i.e. ±0.3 mm).

In a further embodiment of the lens mold carrier according to the invention, the frame comprises a plurality of compartment walls bounding the individual compartments, and the adapter piece comprises a plurality of abutment posts arranged thereon in a manner facing the compartment walls while allowing for the limited movement of the adapter piece in the translation plane.

In still a further embodiment of the lens mold carrier according to the invention, the adapter piece comprises resilient latches releasably engaging the frame or the compartment walls, respectively, to secure the mold unit against falling out of the compartment.

In yet a further embodiment of the lens mold carrier according to the invention, the adapter piece further comprises a mold identifier containing information allowing to identify the lens mold fixedly arranged in the adapter piece.

In a specific embodiment of the afore-mentioned lens mold carrier according to the invention, the mold identifier comprises a transponder.

In one embodiment of the lens mold carrier according to the invention, the lens mold is rigidly arranged in a sleeve which is fixedly connected to the adapter piece, and the sleeve comprises a chamfered front end.

In another embodiment of the lens mold carrier according to the invention, the lens mold is rigidly arranged in a sleeve which is fixedly connected to the adapter piece, and the sleeve comprises a rounded front end.

In a further embodiment of the lens mold carrier according to the invention, the mold unit further comprises an adjusting ring firmly attached to the lens mold or to the sleeve, respectively, and the adjusting ring is lockingly connected to the adapter piece at fixed angular positions and can be rotated between these fixed angular positions in the translation plane or in a plane parallel thereto.

In still a further embodiment of the lens mold carrier according to the invention, the adapter piece comprises at least one stub arranged on the adapter piece adapted to be engaged by a retainer for holding the adapter piece down in the compartment.

In yet a further embodiment of the lens mold carrier according to the invention, the adapter piece is made of plastic, preferably a moldable plastic.

A further embodiment of the lens mold carrier according to the invention comprises a carrier identifier arranged on the frame and containing information allowing to identify the lens mold carrier as well as to identify which lens mold is arranged in which compartment of the mold carrier.

In a specific embodiment of the afore-mentioned lens mold carrier according to the invention, the carrier identifier comprises a transponder.

A further embodiment of the lens mold carrier according to the invention further comprises at least one transport eyelet arranged in the frame, the at least one transport eyelet being sized and shaped to allow a transport pin to engage with the transport eyelet for movement of the lens mold carrier.

A specific embodiment of the afore-mentioned lens mold carrier according to the invention comprises at least one fixation eyelet different from the transport eyelet, the fixation eyelet being arranged in the frame and being sized and shaped to allow a fixation pin to engage with the fixation eyelet to allow for positional fixation of the lens mold carrier as the transport pin is disengaged from the transport eyelet.

The afore-mentioned embodiments of the lens mold carrier according to the invention have a number of advantages. One advantage is, that only one single lens mold carrier is necessary which is capable of carrying the entire plurality of lens molds (mold halves), for example ten to fourteen molds or even more, without the need to perform the afore-described positioning action which has resulted in high wear of the positioning prongs of the positioning rake. Rather, due to the specific arrangement of the mold units within the respective compartments of the frame of the lens mold carrier the positioning of all (e.g. female) molds arranged in the compartments of the frame of one lens mold carrier relative to all corresponding (e.g. male) molds arranged in the compartments of the frame of the corresponding lens mold carrier is achieved automatically during mating of the molds of the two lens mold carriers without any particular positioning action being required.

The individual compartments are arranged at predetermined locations in the frame of the lens mold carrier (which is typically made of metal, but which may also be made of suitable plastics) with very high precision (e.g. positional accuracy of a few hundredths of a millimeter or better). This holds for both the female molds which are carried by one lens mold carrier and for the male molds carried by the corresponding lens mold carrier. In case two molds arranged in the compartments of the respective lens mold carriers are slightly misaligned relative to each other, during mating of the two molds the adapter pieces in which the molds are fixedly arranged can move in their respective compartments to compensate for this slight misalignment. In case the molds are rigidly arranged in sleeves, one of the sleeves to be mated may have a chamfered front end while the corresponding sleeve may have a rounded front end. This measure further facilitates alignment of the molds, since at the time the chamfered front end and the rounded front end come into engagement the adapter pieces move within their compartments so that the two molds automatically get aligned. Once the molds of the two lens mold carriers are automatically aligned, the lens mold carriers can be moved to their final position to determine the shape of the contact lens to be formed, as this is known in the art.

The adapter pieces may be made of plastic, preferably of moldable plastic, which allows for an easy and comparatively inexpensive manufacturing of these adapter pieces. The adapter pieces may comprise resilient latches intended for engagement with the compartment walls of the frame of the lens mold carrier. Thus, it is easily possible to mount the mold unit to the frame of the lens mold carrier by simply pressing the adapter piece into the compartment until the resilient latches snap into engagement with the compartment walls. Once the latches have snapped into engagement with the compartment walls the adapter piece is typically also movable in a direction perpendicular to the translation plane, i.e. in the direction into and out of the compartment.

However, the latches prevent the mold unit from falling out of the respective compartment. For unmounting the mold unit from the compartment, the two latches of the adapter piece must be compressed and then the mold unit can be removed.

Once a contact lens has been formed by curing the lens forming material contained between the molding surfaces of the male and female molds, the male and female molds must be separated to open the mold in order to gain access to the contact lens. For mold separation the lens mold carriers are moved away from each other resulting in considerable forces acting on the connection between the latches and the compartment walls. In order to at least greatly reduce these forces acting on the connection between the latches and the compartments walls, each adapter piece preferably comprises at least one stub which is arranged on the respective adapter piece and is engaged by a retainer bar holding the adapter pieces of all mold units down in the respective compartments of the lens mold carrier during mold separation.

Another advantageous aspect of the lens mold carrier according to the invention deals with the provision of an individual mold identifier in the respective adapter piece. This mold identifier may preferably comprise a transponder. Although other mold identifiers (e.g. bar codes, etc.) are suitable, too, a transponder is an advantageous and inexpensive way to automatically retrieve the details of the specific mold from the transponder. In addition, a carrier identifier may be arranged on the lens mold carrier, and this carrier identifier may also comprise a transponder. The transponder of the carrier identifier may contain information identifying the specific lens mold carrier as well as information identifying the mold units mounted to the compartments of the frame of that lens mold carrier.

Yet another advantageous aspect of the lens mold carrier according to the invention deals with one or more transport eyelets arranged in the frame. These one or more transport eyelets are sized and shaped to allow a transport pin of a transport system to engage into the transport eyelet and transport the lens mold carrier from one process station to another. This has various advantages. Firstly, no stoppers for the lens mold carriers are needed anymore leading to an abrupt stopping of the lens mold carrier. Rather, the lens mold carrier can be continuously and smoothly decelerated during arrival at the process station through the controlled movement of the transport pin, and can be smoothly and continuously accelerated again when leaving the process station again. Secondly, with the aid of such transport pins conveyor belts slipping underneath the lens mold and producing wear as the lens mold carrier stops at the process station can be dispensed with. Due to the precisely controlled movement of the transport pin, the lens mold carrier can be precisely stopped at the desired position in the respective process station. Any light barriers for checking whether all molds have actually arrived at the process station are no longer needed, so that any errors caused by such light barriers can no longer occur. Still further, any positioning rakes with positioning prongs for positioning the molds or sleeves at a predetermined location are no longer needed.

In addition to the one or more transport eyelets, the frame may comprise one or more fixation eyelets. These fixation eyelets are sized and shaped to allow one or more fixation pins to engage with the one or more fixation eyelets. These fixation pins may be arranged at fixed locations in the respective process station. Once the lens mold carrier arrives at the desired position in the process station, the fixation pins engage into the fixation eyelets of the frame so that the lens mold carrier is fixedly positioned in the process station. At that time, the transport pins may be disengaged from the transport eyelets and may be moved back to get the next lens mold carrier. Before the lens mold carrier is transported away from the process station, one or more other transports pin may engage the one or more transport eyelets again and the one or more fixation pins are retracted from the fixation eyelets again. The lens mold carrier can then be transported with the aid of these one or more other transport pins to the next process station.

A still further advantageous aspect of the lens mold carrier according to the invention deals with the provision of an adjusting ring which is firmly attached to the lens mold or to the sleeve, respectively. This adjusting ring is lockingly connected to the adapter piece at fixed angular positions and can be rotated between these fixed angular positions in the translation plane or a plane parallel thereto. During production of toric contact lenses, it is possible to incrementally change the angle of the axes by rotation of the adjustment ring.

As has already been mentioned, the lens mold carrier according to the invention is particularly suitable for the manufacture of ophthalmic lenses, in particular contact lenses such as soft contact lenses.

DETAILED DESCRIPTION OF EMBODIMENTS

Brief Description of the Drawings

Further advantageous aspects become obvious from the following description of embodiments of the invention with the aid of the drawings in which.

In FIG. 1, FIG. 2, FIG. 3 and FIG. 4 a first embodiment of the lens mold carrier 1 according to the invention (or component thereof) is shown. Lens mold carrier 1 comprises a frame 10 which extends in a plane x,y and comprises a plurality of individual compartments 100. Each of the compartments 100 is bounded by compartment walls 101, 102, 103, 104. In addition, in each compartment 100 there is an angled wall portion 105 arranged in one of the corners of the respective compartment 100.

Figure 1:
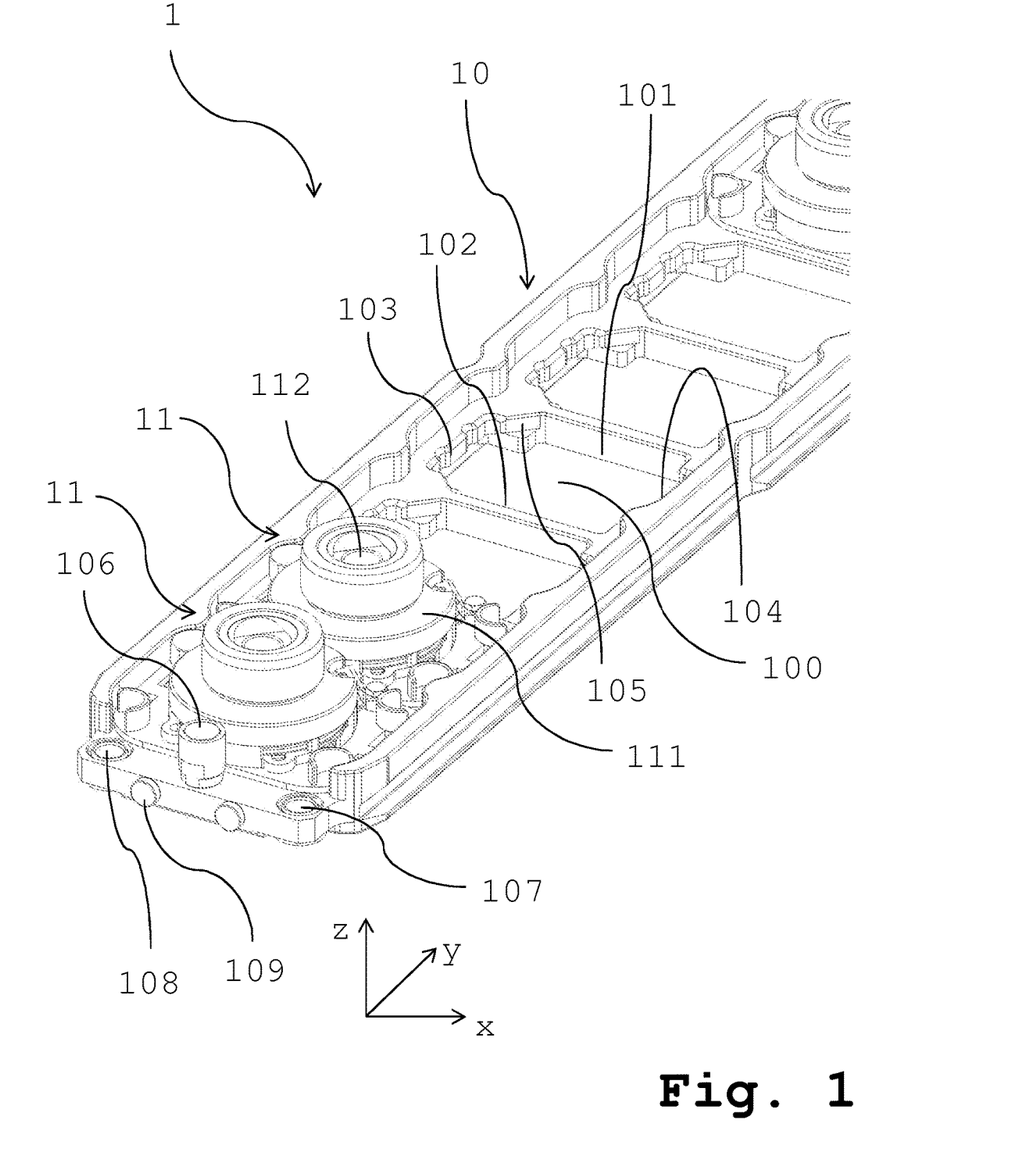
FIG. 1 shows a perspective view from above of a first embodiment of the lens mold carrier according to the invention including two female mold units which are arranged in corresponding compartments of the frame.
Figure 2:
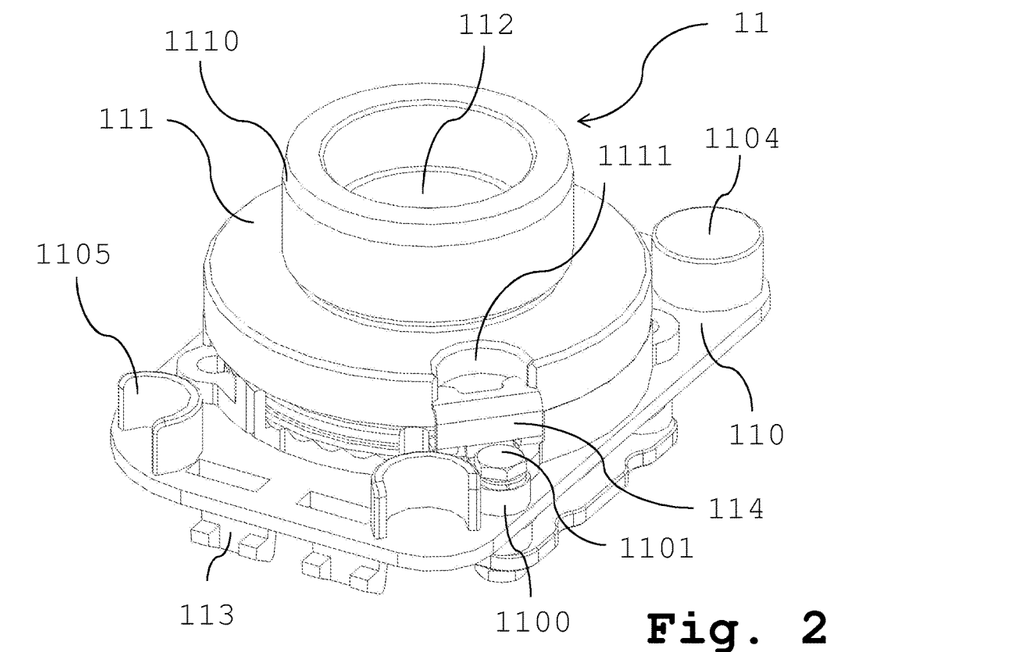
FIG. 2 shows a perspective view from above of the female mold unit of FIG. 1.
Figure 3:
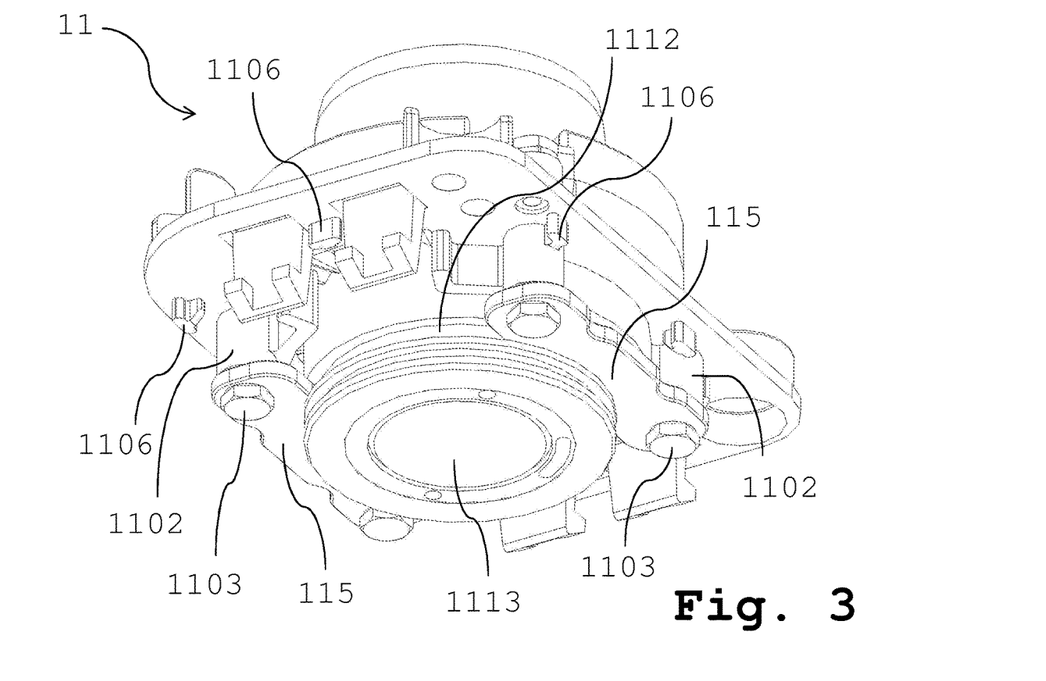
FIG. 3 shows a perspective view from below of the female mold unit of FIG. 1.
Figure 4:
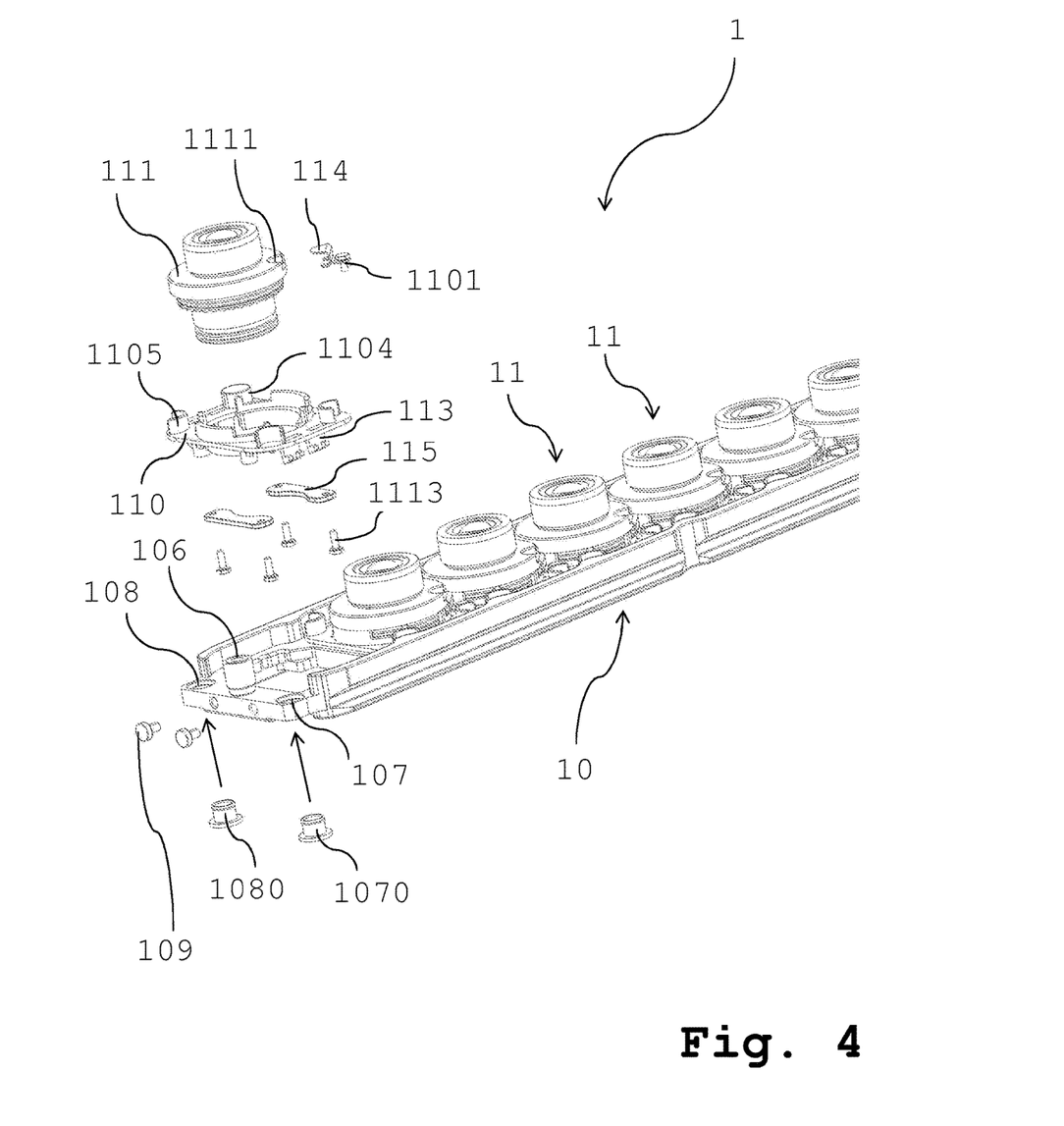
FIG. 4 shows a perspective view from above of the lens mold carrier of FIG. 1 with female mold units being arranged in all compartments, one female mold unit being shown in an exploded view.

As is shown in FIG. 1, in each of the two foremost compartments 100 of frame 10 a female mold unit 11 is arranged, whereas in FIG. 4 in each compartment 100 of frame 10 a female mold unit 11 is arranged. Female mold unit 11 comprises an adapter piece 110, preferably made of a moldable plastic, and a sleeve 111. A female lens mold 112 is rigidly arranged in sleeve 111. Sleeve 111 is arranged in a central opening (see FIG. 4) of adapter piece 110 and is fixedly connected to the adapter piece 110, as will be explained in more detail below.

Sleeve 111 has a generally cylindrical shape (see FIG. 4). At its front end sleeve 111 extends over female lens mold 112, and this front end of sleeve 111 comprises a chamfered portion 1110 for engaging with a corresponding rounded front portion of the sleeve of a male mold unit (see further below) in order to facilitate mating of the male and female mold units. Sleeve 111 further comprises a recess 1111 into which a fixation bracket 114 engages. Fixation bracket 114 is fixedly mounted to a post 1100 projecting from the front face of adapter piece 110 with the aid of a screw 1101 and secures sleeve 111 against rotation.

In the region of its rear end, sleeve 111 comprises two or more circumferentially running grooves 1112. Two fixation brackets 115 engage into one of the circumferentially running grooves 1112 at opposite sides. During mounting of sleeve 111 to adapter piece 110, sleeve 111 is pushed through the central opening in adapter piece 110 (see FIG. 4), and is then connected to the adapter piece 110 with the aid of the two fixation brackets 115, which are each fixedly mounted to two posts 1102 projecting from the rear face of adapter piece 110 with the aid of screws 1103 which secure the sleeve 111 against axial movement. Once the fixation brackets 115 are screwed to posts 1102 and extend into the circumferentially running groove 1112 at opposite sides and once fixation bracket 114 is screwed to post 1100, sleeve 111 is fixedly connected to adapter piece 110 (see FIG. 3). At its rear end, sleeve 111 is provided with a centrally arranged glass disk 1113, as this is well-known in the art.

Adapter piece 110 further comprises a mold identifier 1104 comprising a transponder which is arranged in a stub projecting from the front face of adapter piece 110. The transponder comprises an RFID which can be read automatically and which contains information allowing to identify the female mold 112 of the respective female mold unit 11. Adapter piece 110 further comprises three stubs 1104 projecting from the front face of adapter piece 110. These stubs 1105 have the same height as has the stub of mold identifier 1104.

Adapter piece 110 further comprises two pairs of resilient latches 113. In order to securely mount female mold unit 11 to one of the compartments 100 of frame 10, female mold unit 11 is pressed from above into compartment 100 until the resilient latches 113 of adapter piece 110 snap beneath and engage the compartment walls 103, 104 of frame 10. Once this engagement has occurred, female mold unit 11 is secured in the respective compartment 100 against falling out of the compartment 100, since the resilient latches 113 prevent the adapter piece 110 (and thus the entire female mold unit 11) from inadvertently falling out of the compartment 100 of frame 10. However, although female mold unit 11 is arranged in compartment 100 in a manner secured against falling out, limited movement of the adapter piece 110 is still possible within compartment 100 both in a translation plane (which is a plane parallel to or coincident with the x-y plane) as well as in a direction (z-direction) perpendicular thereto.

As is evident, the movement of adapter piece 110 (and thus of female mold unit 11) within compartment 100 in z-direction is limited by the resilient latches 113. Movement of the adapter piece 110 in the translation plane is limited by six abutment posts 1106 arranged on the rear face of adapter piece 110 and projecting therefrom, with one of the abutment posts 1106 being arranged in a specific manner (not visible in FIG. 3, this will be explained in connection with the lens mold carrier carrying the male mold halves) to allow mounting of adapter piece 110 to compartment 100 only in one orientation (the correct orientation). The limited movement of adapter piece 110 within compartment 100 in the translation plane may amount up to 0.3 mm in the x-direction and up to 0.3 mm in the y-direction (in each of the positive and negative x- or y-direction, respectively; i.e. ±0.3 mm).

As can be seen from FIG. 1, frame 10 is provided with a carrier identifier 106 comprising a transponder which is arranged in a stub projecting from the front face of frame 10. The transponder comprises an RFID which can be read automatically and which contains information allowing to identify the respective lens mold carrier 1 as well as information allowing to identify which female mold 112 is arranged in which compartment 100 of the frame 10 of lens mold carrier 1. With the aid of the carrier identifier 106 and the mold identifier 1104 it is always possible to identify at any time at any desired location in the manufacturing line which mold is arranged in which compartment of which lens mold carrier. This allows for an association of the lens mold to the respective lenses produced with that lens mold which may be advantageous, for example, for quality monitoring purposes.

As can be seen further from FIG. 1 and FIG. 4, frame 10 comprises a transport eyelet 107 at its front end (and may comprise an additional transport eyelet at its rear end, not shown). A sleeve 1070 can be inserted into transport eyelet 107 (see FIG. 4). Frame 10 further comprises a fixation eyelet 108 (and may comprise an additional fixation eyelet at its rear end, not shown), and a corresponding sleeve 1080 can be inserted into fixation eyelet 108 (see FIG. 4).

Transport eyelet 107 (or sleeve 1070, respectively) is sized and shaped to allow a transport pin of a transport system to engage with the transport eyelet 107 (or with sleeve 1070, respectively) for movement of lens mold carrier 1. As has been explained earlier, this allows for smooth and continuous deceleration of the lens mold carrier 1 as it arrives at a process station as well as for smooth and continuous acceleration as the lens mold carrier departs from a process station in the manufacturing line. Once sleeve 1070 is worn, it can be easily replaced with a new sleeve leaving transport eyelet 107 unaffected.

Fixation eyelet 108 (or sleeve 1080, respectively) is sized and shaped to allow a fixation pin arranged at the process station to engage with the fixation eyelet 108 (or with sleeve 1080, respectively) to allow for positional fixation of the lens mold carrier 1 as it has arrived at the process station. Such fixation pin can be arranged at a predetermined desired fixed location in the respective process station. Once lens mold carrier 1 has arrived at the process station and is positioned at the desired location within the process station, fixation pin engages with fixation eyelet 108 (or with sleeve 1080, respectively) so that lens mold carrier 1 remains fixedly arranged at the desired position within that process station. Once the fixation pin has engaged with fixation eyelet 108 (or with sleeve 1080, respectively), the transport pin can be disengaged from transport eyelet 107 and can be moved back to engage into the transport eyelet of the next lens mold carrier in order to transport the next lens mold carrier to the process station once the preceding lens mold carrier has departed from the process station. Once sleeve 1080 is worn, it can be easily replaced with a new sleeve leaving fixation eyelet 108 unaffected. Finally, two elastic shock absorbers 109 are arranged at the front end of frame 10 (and similarly, two such absorbers may be arranged at the rear end, not visible).

In FIG. 5, FIG. 6, FIG. 7, FIG. 8, FIG. 9 and FIG. 10, a second embodiment of the lens mold carrier 2 (or components thereof) is shown. Many details of the second embodiment of the lens mold carrier 2 according to the invention and of its components are similar to those of the first embodiment of the lens mold carrier 1 according to the invention, so that not each and every detail is explained again. As a general rule, the leading "1" of the reference signs used for the first embodiment of the lens mold carrier is replaced with "2" in the second embodiment of the lens mold carrier.

Accordingly, lens mold carrier 2 comprises a frame 20 which extends in a plane u,v and comprises a plurality of individual compartments 200. Each of the compartments 200 is bounded by compartment walls 201, 202, 203, 204. In addition, in each compartment 200 there is an angled wall portion 205 arranged in one of the corners of the respective compartment 200.

Figure 5:
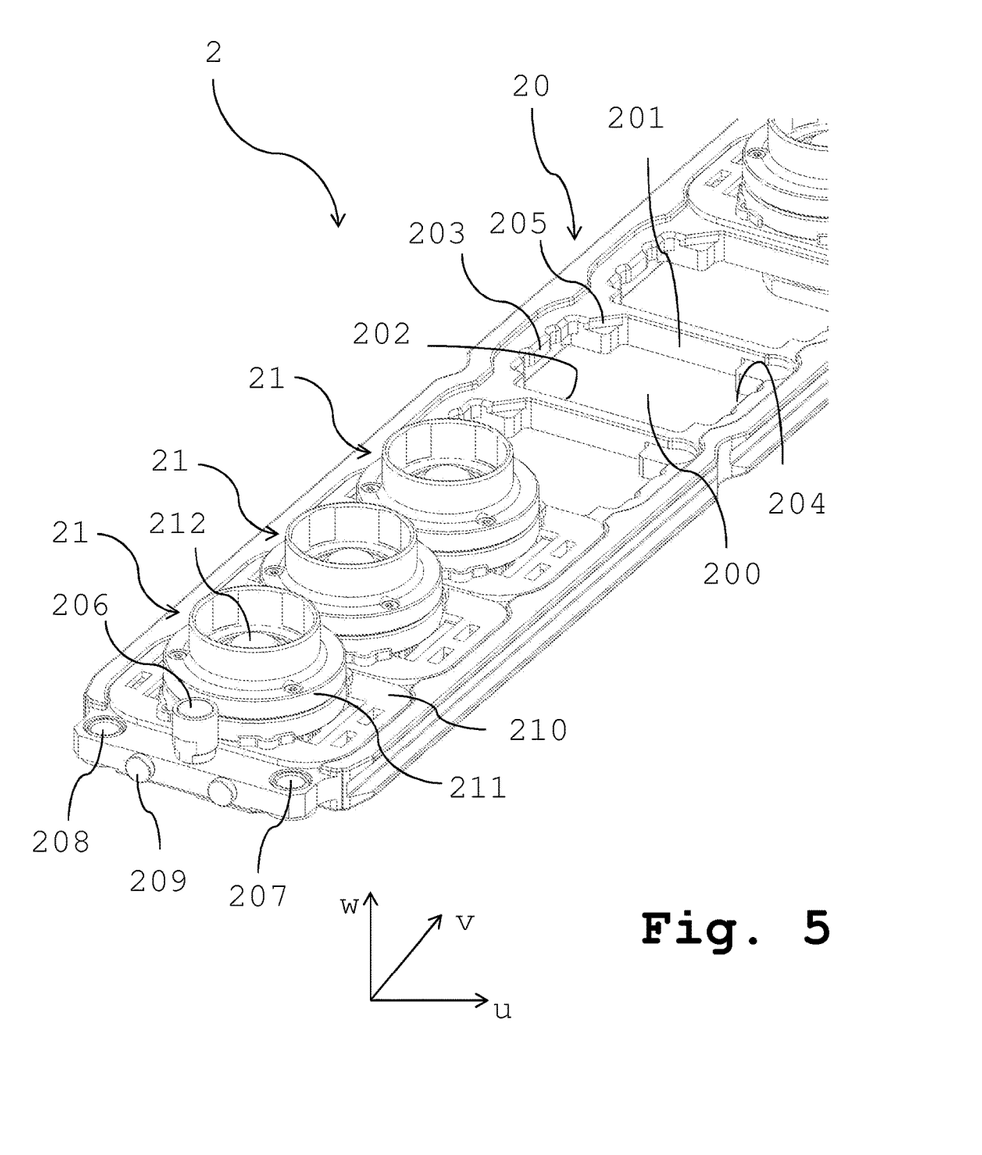
FIG. 5 shows a perspective view from above of a second embodiment of the lens mold carrier according to the invention including three male mold units which are arrange in corresponding compartments of the frame.
Figure 6:
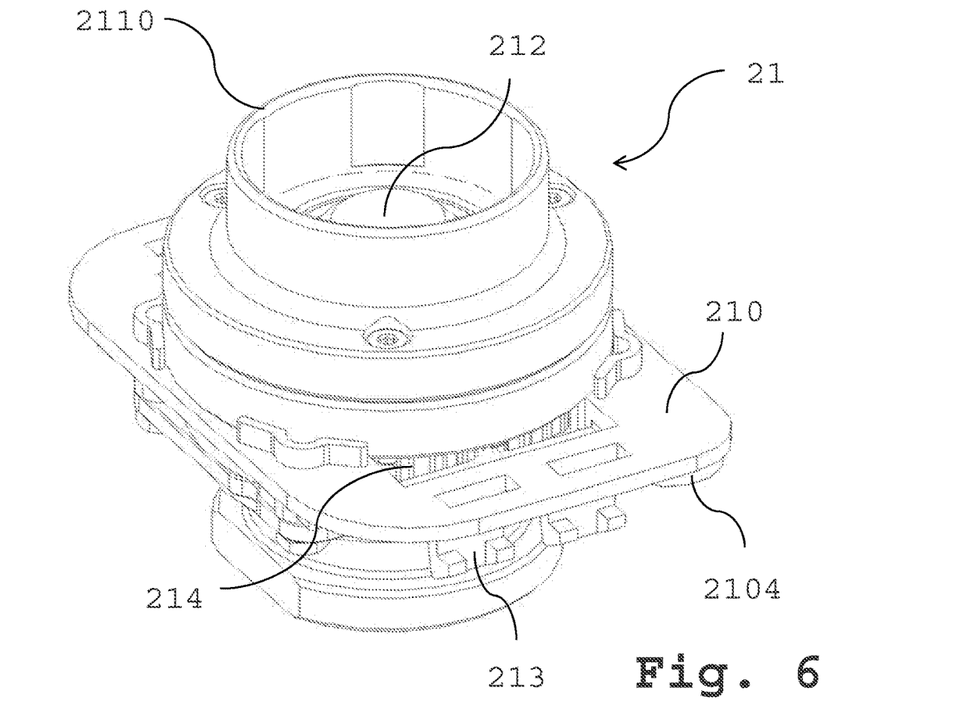
FIG. 6 shows a perspective view from above of the male mold unit of FIG. 5.
Figure 7:
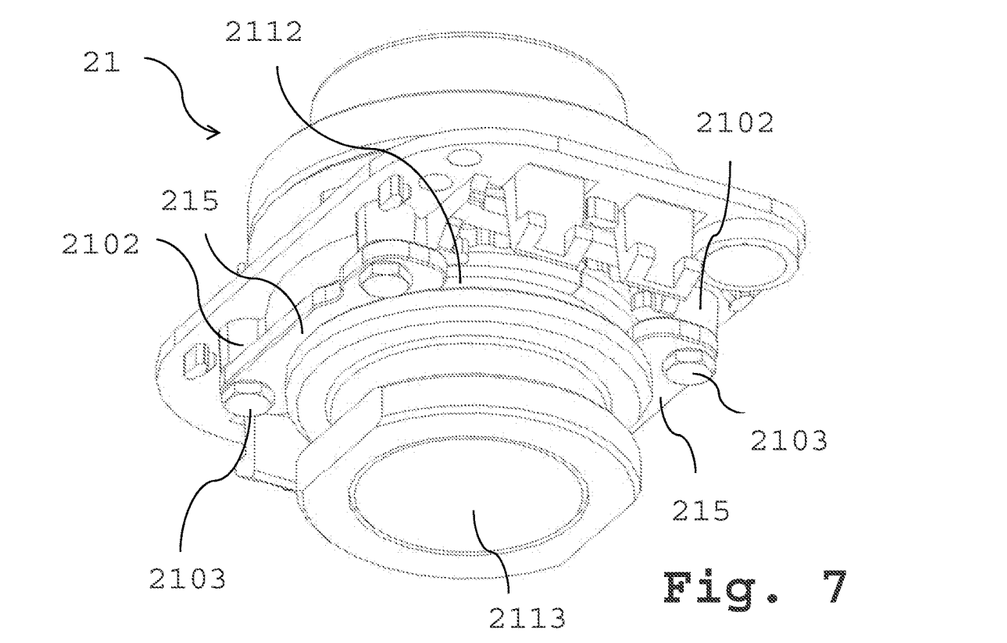
FIG. 7 shows a perspective view from below of the male mold unit of FIG. 5.
Figure 8:
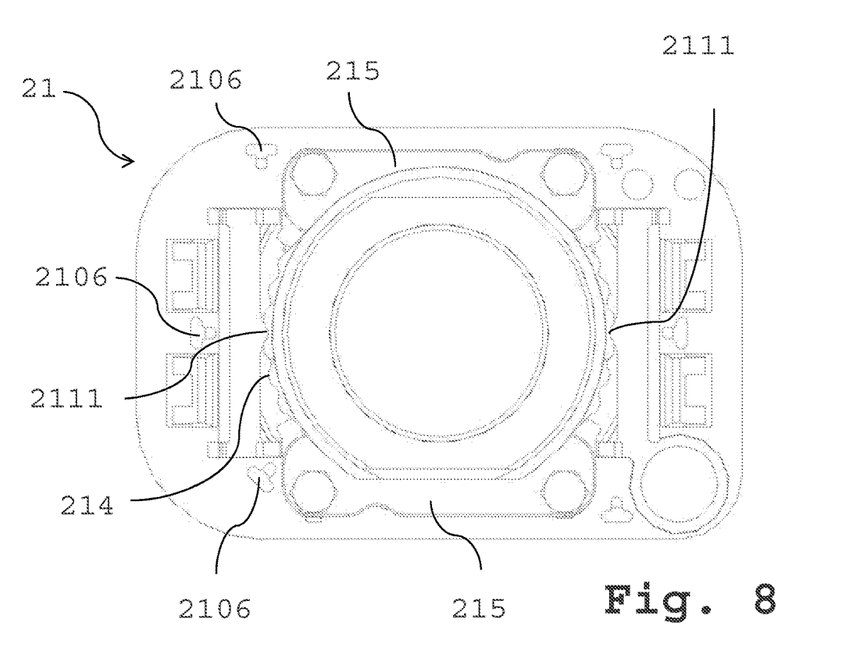
FIG. 8 shows a bottom view of the male mold unit of FIG. 5.
Figure 9:
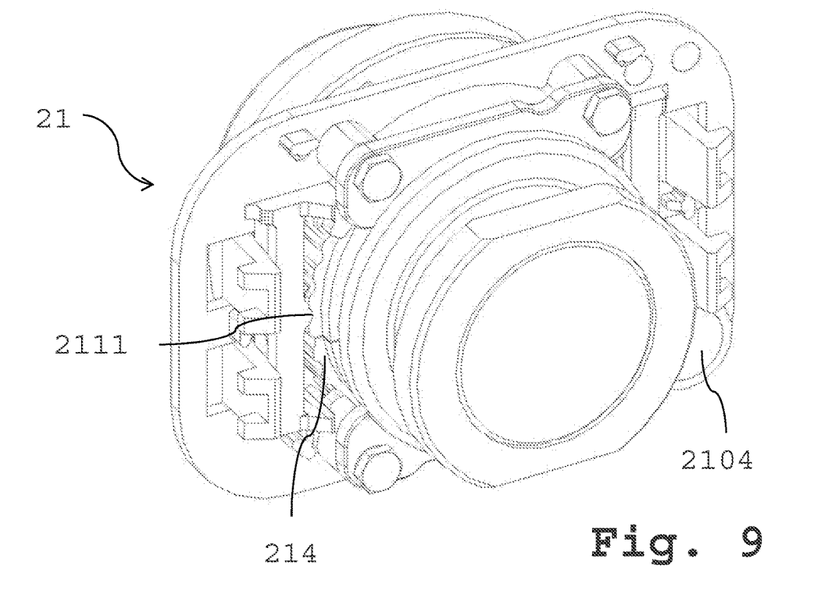
FIG. 9 shows another a perspective view from below of the male mold unit of FIG. 5 showing the adjusting ring lockingly connected to the adapter piece at a fixed angular position.
Figure 10:
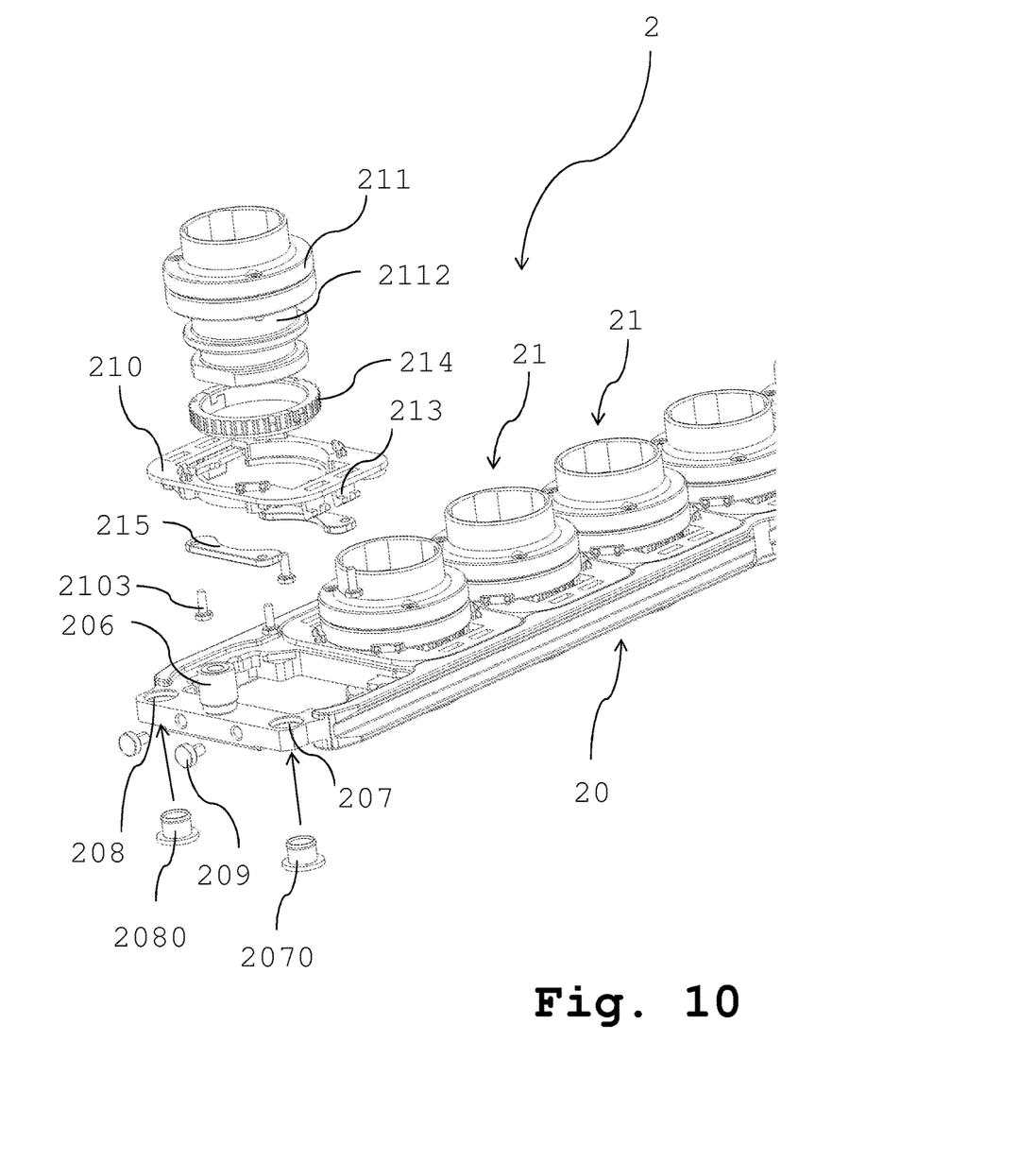
FIG. 10 shows a perspective view from above of the lens mold carrier of FIG. 5 with male mold units being arranged in all compartments, one male mold unit being shown in an exploded view.

As is shown in FIG. 5, in each of the three foremost compartments 200 of frame 20 a male mold unit 21 is arranged, whereas in FIG. 10 in each compartment 200 of frame 20 a male mold unit 21 is arranged. Male mold unit 21 comprises an adapter piece 210, preferably made of a moldable plastic, and a sleeve 211. A male lens mold 212 is rigidly arranged in sleeve 211. Sleeve 211 is arranged in a central opening (see FIG. 10) of adapter piece 210 and is lockingly connected to the adapter piece 210 at a fixed angular position, but can be rotated relative to adapter piece 210 to get lockingly connected to the adapter pieces 210 at another fixed angular position, as will be explained in more detail below.

Sleeve 211 has a generally cylindrical shape (see FIG. 10). At its front end sleeve 211 extends over male lens mold 212, and this front end of sleeve 211 of male mold unit 21 comprises a rounded portion 2110 for engaging with the chamfered portion 1110 of sleeve 111 of the female mold unit 11 (see FIG. 2) in order to facilitate mating of the male and female mold units. Sleeve 211 comprises two circumferentially running grooves 2112. A toothed adjusting ring 214 comprising two assembled ring pieces is arranged in one of these grooves 2112 as well as two fixation brackets 215 engaging into the same groove 2112 at opposite sides. Adjusting ring 214 is firmly attached to sleeve 211 so that it can be rotated only together with sleeve 211 relative to adapter piece 210 in a plane parallel to the u-v plane. However, rotation of adjusting ring 214 is only possible between fixed angular positions, at which the toothed adjusting ring 214 lockingly engages with two fixedly arranged locking teeth 2111 provided on locking elements forming part of the adapter piece 210 (see FIG. 8 and FIG. 9), these two locking teeth 2111 being arranged at opposite sides.

Thus, adjusting ring 214 is lockingly connected to the adapter piece 210 at fixed angular positions. This is advantageous in the production of toric contact lenses since it allows to comparatively easily change the angular position of the axes of (toric) male mold 212 by rotating adjusting ring 214 (and together with it male mold unit 21 including male mold 212) by one or more fixed angular increments relative to adapter piece 210, and to then have it lockingly connected with adapter piece 210 again at a different angular position, so that a toric contact lens with a different arrangement of the axes can be produced.

During mounting of sleeve 211 to adapter piece 210, sleeve 211 with adjusting ring 214 arranged in groove 2112 is pushed through the central opening in adapter piece 210 (see FIG. 10). Sleeve 211 is then connected to adapter piece 210 with the aid of the two fixation brackets 215 also projecting into groove 2112. Each of the fixation brackets 215 is fixedly mounted to two posts 2102 projecting from the rear face of adapter piece 210 with the aid of screws 2103. Sleeve 211 is thereby secured against axial movement. Once the fixation brackets 215 are screwed to posts 2102 and extend into the circumferentially running groove 2112 at opposite sides and the teeth 2111 are lockingly engaged with the toothed adjusting ring 214, sleeve 211 is fixedly connected to adapter piece 210 (see FIG. 7). At its rear end, sleeve 211 is provided with a centrally arranged glass disk 2113 allowing UV-light to pass through to the mold for curing the lens forming material, as this is well-known in the art.

Adapter piece 210 further comprises a mold identifier 2104 comprising a transponder which is arranged in a stub projecting from the rear face of adapter piece 210. The transponder comprises an RFID which can be read automatically and which contains information allowing to identify the male mold 212 of the respective male mold unit 21.

Adapter piece 210 further comprises two pairs of resilient latches 213. In order to securely mount male mold unit 21 to one of the compartments 200 of frame 20, male mold unit 21 is pressed from above into compartment 200 until the resilient latches 213 of adapter piece 210 snap beneath and engage the compartment walls 203, 204 of frame 20. Once this engagement has occurred, male mold unit 21 is secured in the respective compartment 200 against falling out of the compartment 200, since the resilient latches 213 prevent the adapter piece 210 (and thus the entire male mold unit 21) from inadvertently falling out of the compartment 200 of frame 20. However, although male mold unit 21 is arranged in compartment 200 in a manner secured against falling out, limited movement of the adapter piece 210 is still possible within compartment 200 both in a translation plane (which is a plane parallel to or coincident with the u-v plane) as well as in a direction (w-direction) perpendicular thereto.

As is evident, the movement of adapter piece 210 (and thus of male mold unit 21) within compartment 200 in w-direction is limited by the resilient latches 213. Movement of the adapter piece 210 in the translation plane is limited by six abutment posts 2106 arranged on the rear face of adapter piece 210 and projecting therefrom, with one of the abutment posts 2106—that one in the lower left corner in FIG. 8—being arranged in a specific manner to allow mounting of adapter piece 210 to compartment 200 only in one orientation (the correct orientation). The limited movement of adapter piece 210 within compartment 200 in the translation plane may amount up to 0.3 mm in the u-direction and up to 0.3 mm in the v-direction (in each of the positive and negative u- or v-direction, respectively; i.e. ±0.3 mm).

As can be seen from FIG. 5, frame 20 is provided with a carrier identifier 206 comprising a transponder which is arranged in a stub projecting from the front face of frame 20. The transponder comprises an RFID which can be read automatically and which contains information allowing to identify the respective lens mold carrier 2 as well as information allowing to identify which male mold 212 is arranged in which compartment 200 of the frame 20 of lens mold carrier 2. With the aid of the carrier identifier 206 and the mold identifier 2104 it is always possible to identify at any time at any desired location in the manufacturing line which mold is arranged in which compartment of which lens mold carrier. This allows for an association of the lens mold to the respective lenses produced with that lens mold which may be advantageous, for example, for quality monitoring purposes.

As can be seen further from FIG. 5 and FIG. 10, frame 20 comprises a transport eyelet 207 at its front end (and may comprise an additional transport eyelet at its rear end, not shown). A sleeve 2070 can be inserted into transport eyelet 207 (see FIG. 10). Frame 20 further comprises a fixation eyelet 208 (and may comprise an additional fixation eyelet at its rear end, not shown), and a corresponding sleeve 2080 can be inserted into fixation eyelet 208 (see FIG. 10).

Transport eyelet 207 (or sleeve 2070, respectively) is sized and shaped to allow a transport pin of a transport system to engage with the transport eyelet 207 (or with sleeve 2070, respectively) for movement of lens mold carrier 2. As has been explained earlier, this allows for smooth and continuous deceleration of the lens mold carrier 2 as it arrives at a process station as well as for smooth and continuous acceleration as the lens mold carrier departs from a process station in the manufacturing line. Once sleeve 2070 is worn, it can be easily replaced with a new sleeve leaving transport eyelet 207 unaffected.

Fixation eyelet 208 (or sleeve 2080, respectively) is sized and shaped to allow a fixation pin arranged at the process station to engage with the fixation eyelet 208 (or with sleeve 2080, respectively) to allow for positional fixation of the lens mold carrier 2 as it has arrived at the process station. Such fixation pin can be arranged at a predetermined desired fixed location in the respective process station. Once lens mold carrier 2 has arrived at the process station and is positioned at the desired location within the process station, fixation pin engages with fixation eyelet 208 (or with sleeve 2080, respectively) so that lens mold carrier 2 remains fixedly arranged at the desired position within that process station. Once the fixation pin has engaged with fixation eyelet 208 (or with sleeve 2080, respectively), the transport pin can be disengaged from transport eyelet 207 and can be moved back to engage into the transport eyelet of the next lens mold carrier in order to transport the next lens mold carrier to the process station once the preceding lens mold carrier has departed from the process station. Once sleeve 2080 is worn, it can be easily replaced with a new sleeve leaving fixation eyelet 208 unaffected. Finally, two elastic shock absorbers 209 are arranged at the front end of frame 20 (and similarly, two such absorbers may be arranged at the rear end, not visible).

Figure 11:
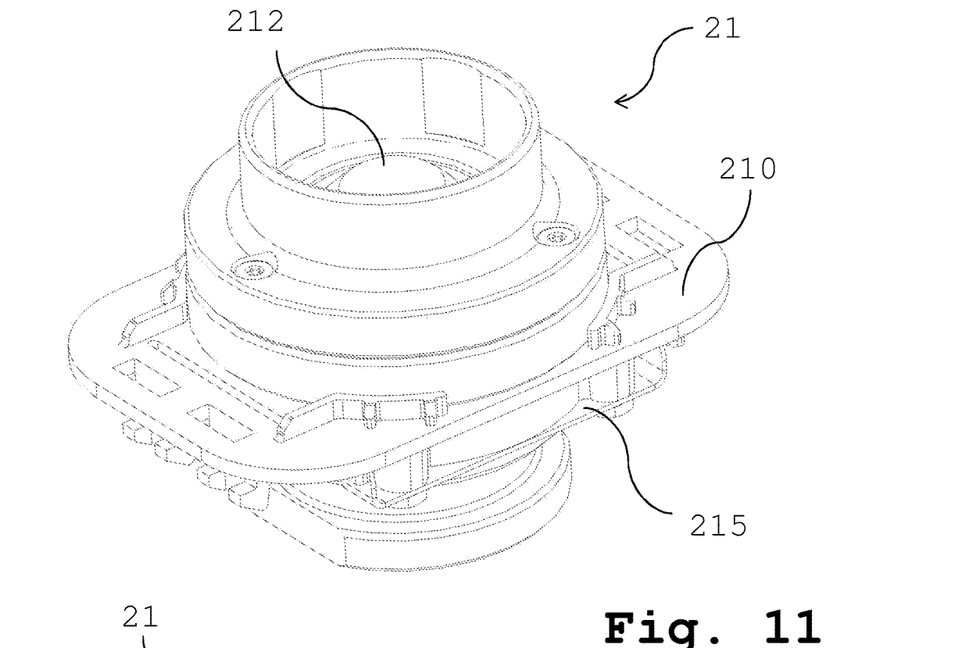
FIG. 11 shows a perspective view from above of another embodiment of the male mold unit.
Figure 12:
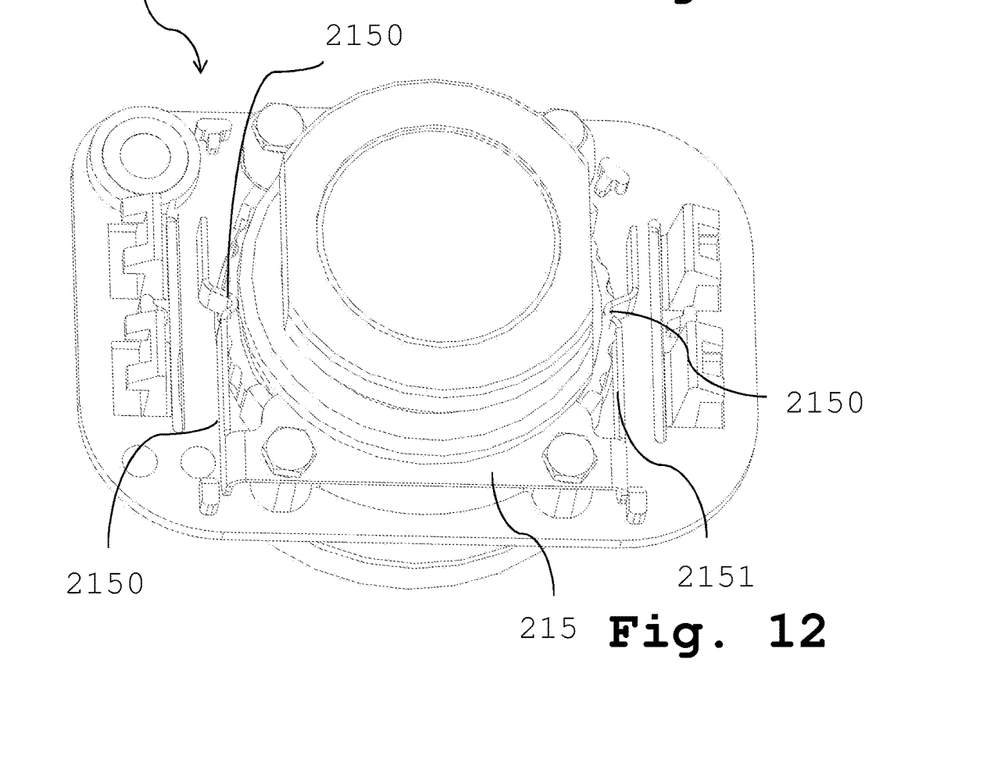
FIG. 12 shows a perspective view from below of the embodiment of the male mold unit of FIG. 11.

FIG. 11 and FIG. 12 show perspective views of a further embodiment of the male mold unit 21. The only difference of this embodiment when compared to the previously described embodiment of the male mold unit 21 is, that the two locking teeth engaging the toothed adjustment ring (see FIG. 8) are no longer provided on locking elements forming part of the adapter piece 210, but rather one of the two brackets 215 is provided with two cantilevers 2151 on which the two locking teeth 2150 are provided. This is advantageous since in case of wear only bracket 215 must be replaced with a new bracket 215 whereas in the embodiment described above the entire adapter piece 210 must be replaced. Since the remaining components of male mold unit 21 are the same as in the afore-described embodiment, they are not described here again.

In the following, an example is described how lens mold carrier 1 and lens mold carrier 2 may work together in a process station. As has been described above, the compartments 100 in frame 10 of lens mold carrier 1 and the compartments 200 in frame 20 of lens mold carrier 2 are very precisely arranged, and adapter piece 110 of female lens mold unit 11 is floatingly arranged in compartment 100 while adapter piece 210 of male lens mold unit 21 is floatingly arranged in compartment 200. Due to the precise arrangement of the compartments 100 and 200 in the frames 10 and 20 the sleeves 111 and 211 are already coarsely aligned as the lens mold carrier 2 is moved towards lens mold carrier 1. During mating, the precise alignment of each pair of associated male mold units 21 and female mold units 11 is then performed automatically: As the rounded portion 2110 of the front end of sleeve 211 comes into contact with the chamfered portion 1110 of the front end of sleeve 111 during mating the lens mold carrier 1 carrying the female mold units 21 and the lens mold carrier 2, either one adapter piece or both adapter pieces of male mold unit 21 and female mold unit 11 move within their respective compartments until the sleeves are precisely aligned. This happens with each pair of associated male mold units 21 and female mold units 11 and is possible due to the floating arrangement of the adapter pieces within the respective compartments. All male mold units 11 and female mold units 21 (including the male molds 212 and female molds 112) are then precisely aligned and the lens mold carriers are then further moved towards each other until the sleeves are in abutting engagement (the molds are then closed) with the individual molds being perfectly aligned.

Once the contact lenses have been formed (for example by exposing the lens forming material enclosed between the male and female molds to UV-light) the molds must be separated again in order to get access to the contact lenses. For this purpose, the lens mold carriers are moved away from each other. However, since the adapter pieces are movable also in z-direction or in w-direction, respectively, within their compartments, this may cause forces acting on the latches which may cause them to fatigue. Let us assume, for example, that lens mold carrier 2 carrying the male mold units 21 is held still while lens mold carrier 2 carrying the female mold units 11 is moved apart in z-direction from lens mold carrier 2. To now prevent the forces from acting on latches 113 two elongated retainer bars (not shown) may be introduced to extend over the stubs 1105 and the mold identifier 1104 also comprising a plastic stub. The retainer bars are then holding the adapter pieces 110 down in their respective compartments when moving the lens mold carrier 1 apart from lens mold carrier 2 so that the forces cannot act on the latches. Once the lens mold carriers are completely moved apart from one another the separated lens mold carriers can be transported to the next station where the contact lenses can be removed from the male or female mold halves.

Although embodiments of the invention have been described with the aid of the drawings, the invention is not limited to these embodiments, but rather various modifications and changes can be made without departing from the teaching underlying the invention. Without being exhaustive and just to mention one, it goes without saying that instead of the male mold unit being rotationally adjustable the female mold unit may be embodied as being rotationally adjustable. Also, both the male and female mold units may be rotationally adjustable, or neither of them may be rotationally adjustable, depending on the application. Accordingly, the invention is not limited to the embodiments but rather the scope of protection is defined by the appended claims.

The invention claimed is:

1. Lens mold carrier (1; 2) comprising:
   a frame (10; 20) extending in a plane (x,y; u,v) and comprising a plurality of individual compartments (100; 200);
   at least one mold unit (11; 21) arranged in one of the individual compartments (100; 200) in a manner secured against falling out, the at least one mold unit (11; 21) including an adapter piece (110; 210) and a lens mold (112; 212) fixedly connected to the adapter piece (110; 210);
   wherein the adapter piece (110; 210) is floatingly arranged within the compartment (100; 200) to allow for limited movement of the adapter piece (110; 210) within the compartment (100; 200) at least in a translation plane parallel to or coincident with the plane (x,y; u,v) in which the frame (10; 20) extends.

2. Lens mold carrier according to claim 1, wherein the range of limited movement of the adapter piece (110; 210) within the individual compartment (100; 200) of the frame (10; 20) in the translation plane is up to about ±0.5 mm.

3. Lens mold carrier according to claim 1, wherein the range of limited movement of the adapter piece (110; 210) within the individual compartment (100; 200) of the frame (10; 20) in the translation plane is up to about ±0.3 mm.

4. Lens mold carrier according to claim 1, wherein the frame (10; 20) comprises a plurality of compartment walls (101,102,103,104,105; 201, 202,203,204,205) bounding the individual compartments (100; 200), and wherein the adapter piece (110; 210) comprises a plurality of abutment posts (1106; 2106) arranged thereon in a manner facing the compartment walls while allowing for the limited movement of the adapter piece (110; 210) in the translation plane.

5. Lens mold carrier according to claim 1, wherein the adapter piece (110; 210) comprises resilient latches (113; 213) releasably engaging the frame or the compartment walls, respectively, to secure the mold unit (11; 21) against falling out of the compartment (100; 200).

6. Lens mold carrier according to claim 2, wherein the adapter piece (110; 210) comprises resilient latches (113; 213) releasably engaging the frame or the compartment walls, respectively, to secure the mold unit (11; 21) against falling out of the compartment (100; 200).

7. Lens mold carrier according to claim 1, wherein the adapter piece (110; 210) further comprises a mold identifier (1104; 2104) containing information allowing to identify the lens mold (112; 212) fixedly arranged in the adapter piece (110; 210).

8. Lens mold carrier according to claim 6, wherein the adapter piece (110; 210) further comprises a mold identifier (1104; 2104) containing information allowing to identify the lens mold (112; 212) fixedly arranged in the adapter piece (110; 210).

9. Lens mold carrier according to claim 7, wherein the mold identifier (1104; 2104) comprises a transponder.

10. Lens mold carrier according to claim 1, wherein the lens mold (112) is rigidly arranged in a sleeve (111) which is fixedly connected to the adapter piece (110), and wherein the sleeve (111) comprises a chamfered front end (1110).

11. Lens mold carrier according to claim 1, wherein the lens mold (212) is rigidly arranged in a sleeve (211) which is fixedly connected to the adapter piece (210), and wherein the sleeve (211) comprises a rounded front end (2110).

12. Lens mold carrier according to claim 2, wherein the lens mold (212) is rigidly arranged in a sleeve (211) which is fixedly connected to the adapter piece (210), and wherein the sleeve (211) comprises a rounded front end (2110).

13. Lens mold carrier according to claim 1, wherein the mold unit (21) further comprises an adjusting ring (214) firmly attached to the lens mold or to the sleeve, respectively, and wherein the adjusting ring (214) is lockingly connected to the adapter piece (210) at fixed angular positions and can be rotated between these fixed angular positions in the translation plane or in a plane parallel thereto.

14. Lens mold carrier according to claim 1, wherein the adapter piece (110) comprises at least one stub (1105) arranged on the adapter piece (110) adapted to be engaged by a retainer for holding the adapter piece (110) down in the compartment (100).

15. Lens mold carrier according to claim 1, wherein the adapter piece (110; 210) is made of plastic.

16. Lens mold carrier according to claim 1, further comprising a carrier identifier (106; 206) arranged on the frame (10; 20) and containing information allowing to identify the lens mold carrier (1; 2) as well as to identify which lens mold (112; 212) is arranged in which compartment (100; 200) of the frame (10; 20).

17. Lens mold carrier according to claim 7, further comprising a carrier identifier (106; 206) arranged on the frame (10; 20) and containing information allowing to identify the lens mold carrier (1; 2) as well as to identify which lens mold (112; 212) is arranged in which compartment (100; 200) of the frame (10; 20).

18. Lens mold carrier according to claim 16, wherein the carrier identifier (106; 206) comprises a transponder.

19. Lens mold carrier according to claim 1, wherein the lens mold carrier further comprises at least one transport eyelet (107; 207) arranged in the frame (10; 20), the at least one transport eyelet (107; 207) being sized and shaped to allow a transport pin to engage with the transport eyelet (107; 207) for movement of the lens mold carrier (1; 2).

20. Lens mold carrier according to claim 19, where the lens mold carrier further comprises at least one fixation eyelet (108; 208) different from the transport eyelet (107; 207), the fixation eyelet (108; 208) being arranged in the frame (10; 20) and being sized and shaped to allow a fixation pin to engage with the fixation eyelet (108; 208) to allow for positional fixation of the lens mold carrier (1; 2) as the transport pin is disengaged from the transport eyelet (107; 207).

* * * * *